(12) United States Patent
Xu et al.

(10) Patent No.: US 12,180,355 B2
(45) Date of Patent: Dec. 31, 2024

(54) RUBBER COMPOSITION, PROCESSING METHOD THEREOF, AND BRAKING-RESISTANT LIQUID PRODUCT USING THE SAME

(71) Applicant: HANGZHOU XINGLU TECHNOLOGIES CO., LTD, Zhejinag (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGIES CO., LTD, Zhejinag (CN); SHAOXING PINGHE NEW MATERIAL TECHNOLOGY CO., LTD., Zhejinag (CN)

( * ) Notice: Subject to any disclaimer, the term of this patent is extended or adjusted under 35 U.S.C. 154(b) by 533 days.

(21) Appl. No.: 16/477,519

(22) PCT Filed: Jan. 12, 2018

(86) PCT No.: PCT/CN2018/072371
§ 371 (c)(1),
(2) Date: Jul. 11, 2019

(87) PCT Pub. No.: WO2018/130198
PCT Pub. Date: Jul. 19, 2018

(65) Prior Publication Data
US 2020/0332104 A1    Oct. 22, 2020

(30) Foreign Application Priority Data

Jan. 13, 2017 (CN) .......................... 201710025141.2
Jan. 10, 2018 (CN) .......................... 201810020805.0

(51) Int. Cl.
| | | |
|---|---|---|
| *C08L 23/16* | (2006.01) | |
| *C08K 3/04* | (2006.01) | |
| *C08K 3/22* | (2006.01) | |
| *C08K 3/26* | (2006.01) | |
| *C08K 3/34* | (2006.01) | |
| *C08K 5/00* | (2006.01) | |

(Continued)

(52) U.S. Cl.
CPC ................ *C08L 23/16* (2013.01); *C08K 3/04* (2013.01); *C08K 3/22* (2013.01); *C08K 3/26* (2013.01); *C08K 3/346* (2013.01); *C08K 5/0025* (2013.01); *C08K 5/09* (2013.01); *C08K 5/14* (2013.01); *C08L 23/06* (2013.01); *F16L 11/08* (2013.01); *C08K 2003/2296* (2013.01); *C08K 2003/265* (2013.01); *C08L 23/22* (2013.01); *C08L 71/00* (2013.01); *C08L 2205/02* (2013.01); *C08L 2205/03* (2013.01); *C08L 2312/00* (2013.01)

(58) Field of Classification Search
CPC .......... C08L 23/08; C08L 23/16; C08L 23/06; C08L 23/04; C08L 91/00; C08L 71/02; C08K 5/0016; C08K 3/22; C08K 3/346; C08K 5/0025; C08K 3/013; C08K 5/34924; C08K 5/14; C08K 3/04; C08K 3/011; C08K 5/005; C08K 3/06; C08K 3/26; C08K 5/09; C08K 2003/265; C08K 2003/2217; C08K 2003/2206; C08K 2003/2296; C08K 2003/222; C08K 2201/014
See application file for complete search history.

(56) References Cited

U.S. PATENT DOCUMENTS 3,911,796 A * 10/1975 Hull ........................ B60T 17/08
                                                     92/101
6,103,658 A    8/2000 Mackenzie et al.
(Continued)

FOREIGN PATENT DOCUMENTS

CN    101531725 A    9/2009
CN    101688031 A    3/2010
(Continued)

OTHER PUBLICATIONS

SIPO, International Search Report issued in IA No. PCT/CN2018/072371, mailed Apr. 19, 2018.
Guowen, W. et al. "Selection of Rubber Materials", Chemical Industry Press, 2010, table 5-16, p. 161.
Bin, T. et al., "Applied Technology of Ethylene Propylene Rubber", Chemical Industry Press, 2005, p. 33, table 2-8, China Cataloguing In Publication.
(Continued)

*Primary Examiner* — Marc S Zimmer
*Assistant Examiner* — Jeffrey S Lenihan
(74) *Attorney, Agent, or Firm* — LKGlobal | Lorenz & Kopf, LLP

(57) ABSTRACT

The present invention discloses a rubber composition, a processing method thereof, and also a brake fluid-resistant product using the rubber composition and a production method thereof. The rubber composition comprises, in parts by weight, 100 parts of a rubber matrix; 1.5-8 parts of a crosslinking agent 40-140 parts of a reinforcing filler; and 0-40 parts of a plasticizer, wherein the rubber matrix comprises, based on 100 parts by weight of the rubber matrix, a branched polyethylene with a content represented as A, in which 0<A≤100 parts; an EPM with a content represented as B, in which 0≤B<100 parts; and an EPDM with a content represented as C, in which 0≤C<100 parts. The rubber composition is useful in the production of brake fluid-resistant brake rubber hose and brake rubber diaphragm. The beneficial effect is that since the rubber composition comprises the branched polyethylene, the tear strength of the rubber compound is improved, thereby reducing the probability of tearing of the product during the production process and improving the overall processing performance.

16 Claims, No Drawings

(51) Int. Cl.
*C08K 5/09* (2006.01)
*C08K 5/14* (2006.01)
*C08L 23/06* (2006.01)
*C08L 23/22* (2006.01)
*C08L 71/00* (2006.01)
*F16L 11/08* (2006.01)

(56) References Cited

U.S. PATENT DOCUMENTS

| | | | |
|---|---|---|---|
| 6,433,080 B1 * | 8/2002 | Fujiki | C08L 21/00 |
| | | | 524/378 |
| 6,660,677 B1 | 12/2003 | Mackenzie et al. | |
| 9,580,587 B2 | 2/2017 | Clayfield et al. | |
| 11,479,661 B2 * | 10/2022 | Xu | E01D 19/041 |
| 11,499,041 B2 * | 11/2022 | Xu | C08K 5/34924 |
| 2008/0269366 A1 | 10/2008 | Shaffer et al. | |
| 2012/0252917 A1 | 10/2012 | Kisin et al. | |
| 2014/0326355 A1 * | 11/2014 | Nonaka | F16L 11/086 |
| | | | 138/126 |
| 2020/0216647 A1 | 7/2020 | Xu et al. | |

FOREIGN PATENT DOCUMENTS

| | | | |
|---|---|---|---|
| CN | 201535398 U | | 7/2010 |
| CN | 101812145 A | | 8/2010 |
| CN | 102617938 A | | 8/2012 |
| CN | 102827312 A | | 12/2012 |
| CN | 102892827 A | | 1/2013 |
| CN | 103975013 A | | 8/2014 |
| CN | 103980596 A | * | 8/2014 |
| CN | 104926962 A | | 9/2015 |
| CN | 105017658 A | * | 9/2015 |
| CN | 104877225 A | * | 11/2015 |
| CN | 107556577 A | * | 1/2018 |
| WO | 2009035885 A1 | | 3/2009 |

OTHER PUBLICATIONS

Rojas, G. et al., "Precision polyolefin structure: Modeling polyethylene containing alkyl branches", Polymer, Jun. 23, 2008, pp. 2985-2995, vol. 49, No. 13-14.

* cited by examiner

RUBBER COMPOSITION, PROCESSING METHOD THEREOF, AND BRAKING-RESISTANT LIQUID PRODUCT USING THE SAME

CROSS REFERENCE TO RELATED APPLICATIONS

The present application is the U.S. national phase of and claims priority to International Patent Application No. PCT/CN2018/072371 filed Jan. 12, 2018, which claims the benefit of priority from China National application No. 201710025141.2, filed on Jan. 13, 2017 and China National application No. 201810020805.0, filed on Jan. 10, 2018, the entire content of each of which is incorporated herein by reference into the present disclosure as if fully set forth herein.

TECHNICAL FIELD

The present invention relates to the technical field of rubbers, in particular to a rubber composition, and a processing method thereof, and further to a brake fluid-resistant product using the rubber composition and a production method thereof.

BACKGROUND

Because ethylene-propylene rubbers have excellent resistance to brake fluid and low water permeability, and can withstand the high temperature caused by high speed and frequent braking, aging-resistant ethylene-propylene rubbers have become the most prevalent rubbers in the production of brake rubber hoses, brake rubber diaphragms or other seals that contact the brake fluid at present. With the development of the automobile industry, the requirement for anti-aging performance of vehicle rubber products resistant to brake fluid becomes increasingly higher. Such rubber products resistant to brake fluid are often vulcanized by a peroxide. However, the tear strength of the rubber after peroxide vulcanization is lower than that of the rubber obtained by sulfur vulcanization, which results in more unqualified products in the production, thus reducing the production efficiency and increasing the production cost.

Ethylene-propylene rubbers are a kind of synthetic rubbers with a saturated molecular backbone, and include ethylene propylene monomer (EPM) and ethylene-propylene-diene monomer (EPDM), both of which have good aging resistance. EPDM is commonly used in the ethylene-propylene rubber products. However, since EPDM contains a third monomer with a molecular chain having a double bond and EPM has a completely saturated molecular chain, EPM has more excellent aging resistance. Therefore, in a situation where a higher requirement is raised for the aging resistance, it is a common technical solution to use EPM in combination to improve the aging resistance of EPDM. However, the mechanical strength of EPM is low, which affects the overall physical and mechanical properties.

EPM is a copolymer of ethylene and propylene, which is a copolymer of ethylene and an α-olefin. The copolymer of ethylene and an α-olefin is a polymer containing only carbon and hydrogen elements and having a saturated molecular chain. The common types of carbon atoms found in such polymers generally include primary, secondary and tertiary carbons, in which the tertiary carbon is most susceptible to hydrogen abstraction to form a free radical. Accordingly, the proportion of tertiary carbon atoms in all carbon atoms is generally considered to be a major factor affecting the aging resistance of ethylene/α-olefin copolymers. The lower the proportion is, the better the aging resistance will be. The proportion can be expressed by the degree of branching. For example, EPM having a propylene content of 60% by weight can be calculated to contain 200 propylene units, that is, 200 tertiary carbon atoms or 200 methyl branches, per 1000 carbon atoms, so the degree of branching is 200 branches/1000 carbon atoms. EPM usually has an ethylene content of 40-65% or 40-60% by weight, so the degree of branching is generally in the range of 117-200 branches/1000 carbon atoms or 133-200 branches/1000 carbon atoms. This degree of branching is considered to be higher than that of other common ethylene/α-olefin copolymers.

In the prior art, the α-olefin in the common ethylene/α-olefin copolymers may include, in addition to propylene, an α-olefin having a carbon number of not less than 4, which may be selected from a C4-C20 α-olefin, and is generally selected from 1-butene, 1-hexene and 1-octene. If the degree of branching of an ethylene/α-olefin copolymer is too low, the melting point and crystallinity are too high, so it is not suitable for use as a rubber component. If the degree of branching is too high, the content of α-olefin is high, which leads to a higher process difficulty and raw material cost, and a lower operability and economical efficiency. In the prior art, a polyolefin obtained by copolymerizing ethylene with 1-butene or ethylene with 1-octene can be referred to as a polyolefin plastomer or a polyolefin elastomer according to the magnitudes of crystallinity and melting point. Due to their proper crystallinity and melting point, some polyolefin elastomer brands can be well used in combination with an ethylene-propylene rubber and have a low degree of branching, so they are considered to be an ideal material for improving the aging resistance of ethylene-propylene rubbers, and can be used in place of ethylene-propylene rubbers to some extent. Since an ethylene/1-octene copolymer has more flexible molecular chain, higher rubber elasticity, and better mechanical performance than an ethylene/1-butene copolymer, the polyolefin elastomer commonly used in rubber products is generally a copolymer of ethylene and 1-octene at present, in which the octene content in percentages by weight is generally not higher than 45%, and more generally not higher than 40%, and the corresponding degree of branching is generally not higher than 56 branches/1000 carbon atoms, and more generally not higher than 50 branches/1000 carbon atoms, which is much lower than the degree of branching of EPM. Therefore, the ethylene/1-octene copolymer has excellent aging resistance and good physical and mechanical properties.

Rubbers are usually used after cross-linking. Among common cross-linking methods for ethylene-propylene rubbers, peroxide cross-linking or irradiation cross-linking can be suitably used for a copolymer of ethylene and an α-olefin, both of which mainly comprising: forming a tertiary carbon radical by hydrogen abstraction from a tertiary carbon and then creating a carbon-carbon crosslink by free radical bonding. However, an ethylene/1-octene copolymer (hereinafter referred to as POE) has a low number of tertiary carbon atoms and has a longer branch attached to the tertiary carbon atom, so the steric hindrance is large, and the free radical reaction is difficult to occur, resulting in difficulty in crosslinking, thus affecting the processing efficiency and product performance. For example, the compression set resistance is unsatisfactory.

Therefore, there is currently a need for a better technical solution, which can improve the aging resistance of ethylene-propylene rubbers while the rubber composition has good physical and mechanical properties and cross-linking performances, and is expected to behave well with respect to particular functional performances of target rubber products (for example, compression set resistance and so on).

SUMMARY

In view of the problems existing in the prior art, the present invention provides a novel rubber composition, a processing method for obtaining the rubber composition, and use of the rubber composition in the production of rubber products. In the present invention, branched polyethylene with a degree of branching of not less than 50 branches/1000 carbon atoms is used to replace a part or all of the ethylene-propylene rubber, and peroxide vulcanization is adopted The new rubber composition is useful as a rubber compound for brake fluid-resistant rubber products.

In order to achieve the above technical object, the present invention provides a rubber composition comprising a rubber matrix and essential components. The rubber matrix comprises, in parts by weight, a branched polyethylene with a content represented as A, in which 0<A≤100 parts, an EPM with a content represented as B, in which 0≤B<100 parts; and an EPDM with a content represented as C, in which 0≤C<100 parts; and based on 100 parts by weight of the rubber matrix, the essential components comprise 1.5 to 8 parts of a crosslinking agent, 40 to 140 parts of a reinforcing filler, and 0-40 parts of a plasticizer, where the branched polyethylene has a degree of branching of not less than 50 branches/1000 carbon atoms, a weight average molecular weight of not less than 50,000, and a Mooney viscosity ML (1+4) at 125° C. of not less than 2.

In the prior art, "branched polyethylene" refers to, in addition to an ethylene homopolymer having branches, a saturated vinyl copolymer having branches, for example, an ethylene-α-olefin copolymer, which may be POE. Although POE performs well in physical and mechanical properties and aging resistance, the cross-linking performances are less good. Therefore, although the branched polyethylene of the present invention can include both a branched ethylene homopolymer and POE, it is preferred that the branched polyethylene comprises a high proportion of or exclusively a branched ethylene homopolymer. In a preferred embodiment of the present invention, the branched polyethylene comprises exclusively a branched ethylene homopolymer.

In the further elaboration of the technical solution of the present invention, the branched polyethylene used is a branched ethylene homopolymer unless otherwise particularly specified.

The branched polyethylene used in the present invention is a kind of ethylene homopolymer having a degree of branching of not less than 50 branches/1000 carbon atoms, which may also be referred to as Branched Polyethylene or Branched PE. Currently, the synthesis method comprises mainly homopolymerizing ethylene following a "chain walking mechanism" in the presence of a late transition metal catalyst, where the late transition metal catalyst is preferably an (α-diimine)nickel/palladium catalyst. The nature of the chain walking mechanism refers to the fact that a β-hydrogen elimination reaction and a re-insertion reaction tend to occur in the polymerization of an olefin in the presence of a late transition metal catalyst, for example, an (α-diimine)nickel/palladium catalyst, thereby causing branching. The branches pendant to the backbone of such branched polyethylene may have different numbers of carbon atoms, and specifically 1 to 6 or more carbon atoms.

The production cost of an (α-diimine) nickel catalyst is significantly lower than that of an (α-diimine) palladium catalyst, and the (α-diimine) nickel catalyst has a high rate and high activity in catalyzing the polymerization of ethylene, and is thus more suitable for industrial application. Therefore, in the present invention, the (α-diimine) nickel catalyst is preferably used in the production of branched polyethylene through catalytic polymerization of ethylene. The degree of branching of the branched polyethylene used in the present invention is preferably 50 to 130 branches/1000 carbon atoms, further preferably 60 to 130 branches/1000 carbon atoms, and further preferably 60 to 116 branches/1000 carbon atoms. The degree of branching is between that of POE and EPM, constituting a new technical solution that is different from the prior art. Therefore, the rubber matrix of present invention has both excellent aging resistance and good cross-linking performances.

The cross-linking performances include factors such as crosslinking density and crosslinking rate, and are the specific manifestations of the cross-linking ability of the rubber matrix in the processing process.

The branched polyethylene used in the present invention preferably has a methyl branch content of 40% or more or 50% or more, and has a similarity in structure with EPM. In terms of the crosslinking ability, the degree of branching (the content of tertiary carbon atom) and the steric hindrance around the tertiary carbon atom are the two main factors affecting the crosslinking ability of a saturated polyolefin. Compared with EPM, the branched polyethylene used in the present invention has a low degree of branching, and since the branched polyethylene has branches with the carbon number of not less than 2, the steric hindrance around the tertiary carbon atom of the branched polyethylene used in the present invention is theoretically greater than that of EPM. Taking the two factors into account, it can be inferred that the crosslinking ability of the branched polyethylene used in the present invention is weaker than that of EPM and further weaker than that of EPDM. However, the actual crosslinking ability of the partially branched polyethylene used in the present invention is close to, and can even be equal to or better than that of EPDM. This means that the rubber composition of the present invention can achieve a good aging resistance while the crosslinking ability is not weakened, and can even have excellent crosslinking performances to achieve unexpected beneficial effects.

This may be explained by the fact that there may be an appropriate number of secondary branch structures on the branched polyethylene used in the preferred technical solution of the present invention. The so-called secondary branch structure refers to a branch structure that further exists on a branch, which is formed in the chain walking process. This structure is also called "branch-on-branch". Because the steric hindrance around the tertiary carbon atoms of the secondary branch is low, a cross-linking reaction is more likely to occur. Having a secondary branch structure is a significant distinct of the branched polyethylene used in the preferred embodiment of the present invention from the EPM rubber or the conventional ethylene-α-olefin copolymer in the prior art.

It is a new technical solution to improve the crosslinking ability of a saturated polyolefin elastomer by using the secondary branch structure with lower steric hindrance. According to the technical solution of the present invention, it is also considered to be within the technical protection of the present invention to include a vinyl copolymer having a secondary branch structure or other saturated hydrocarbon polymers in the rubber matrix. The vinyl copolymer refers to a copolymer of ethylene with a branched α-olefin and has a secondary branch structure. The branched α-olefin may be selected from the group consisting of isobutene, 3-methyl-1-butene, 4-methyl-1-pentene, 3-methyl-1-pentene, 2-methyl-1-heptene, 3-methyl-1-heptene, 4-methyl-1-heptene, 5-methyl-1-heptene, and 6-methyl-1-heptene, and the comonomer may also include a common linear α-olefin.

It is generally believed in the prior art that the branched polyethylene produced in the presence of an (α-diimine) nickel catalyst is difficult to have a secondary branch structure that is at least difficult to fully identify, and the technical solution of the present invention also provides a new idea for analyzing the structure of the branched polyethylene.

Compared with the ethylene-propylene rubber, when branched polyethylene has an appropriate number of secondary branch structures, the crosslinking point of the branched polyethylene can be generated on the tertiary carbon of the backbone or on the branched tertiary carbon of the secondary structure during the peroxide crosslinking. Therefore, the rubber network formed by the peroxide crosslinking of the branched polyethylene has richer C—C bonding segments between the main chains than the ethylene-propylene rubber, which can effectively avoid the concentration of stress, and contribute to better mechanical properties, including tear strength. Moreover, better crosslinking ability can effectively increase the crosslinking density, and the molecular weight distribution of the branched polyethylene is close to 2, which is narrower than a common ethylene-propylene rubber, so it is expected to obtain better compression set resistance.

In a preferred embodiment, when the content of branched polyethylene in the rubber matrix is more than 90 parts, based on 100 parts by weight of the rubber matrix, the essential components comprise 6-40 parts of the plasticizer, where the branched polyethylene is an ethylene homopolymer having a degree of branching of not less than 50 branches/1000 carbon atoms, a weight average molecular weight of not less than 50,000, and a Mooney viscosity ML (1+4) at 125° C. of not less than 2.

In a preferred embodiment, when the content of branched polyethylene in the rubber matrix is more than 90 parts, based on 100 parts by weight of the rubber matrix, the essential components comprise 10-30 parts of the plasticizer, where the branched polyethylene is an ethylene homopolymer having a degree of branching of not less than 50 branches/1000 carbon atoms, a weight average molecular weight of not less than 50,000, and a Mooney viscosity ML (1+4) at 125° C. of not less than 2.

In a preferred embodiment, the rubber matrix comprises, based on 100 parts by weight, a branched polyethylene with a content represented as A, in which 10≤A≤100 parts; and an EPM with a content represented as B and an EPDM with a content represented as C, in which 0≤B+C≤90 parts, where the branched polyethylene used is an ethylene homopolymer having a degree of branching of 60 to 130 branches/1000 carbon atoms, a weight average molecular weight of 66,000 to 518,000, and a Mooney viscosity ML (1+4) at 125° C. of 6 to 102.

In a preferred embodiment, the rubber matrix comprises, based on 100 parts by weight, a branched polyethylene with a content represented as A, in which 10≤A≤100 parts; and an EPM with a content represented as B and an EPDM with a content represented as C, in which 0≤B+C≤90 parts, where the branched polyethylene used is an ethylene homopolymer having a degree of branching of 70 to 116 branches/1000 carbon atoms, a weight average molecular weight of 201,000 to 436,000, and a Mooney viscosity ML (1+4) at 125° C. of 23 to 93.

In a preferred embodiment, the rubber matrix comprises, based on 100 parts by weight, a branched polyethylene with a content represented as A, in which 10≤A≤100 parts; and an EPM with a content represented as B and an EPDM with a content represented as C, in which 0≤B+C≤90 parts, where the branched polyethylene used is an ethylene homopolymer having a degree of branching of 80 to 105 branches/1000 carbon atoms, a weight average molecular weight of 250,000 to 400,000, and a Mooney viscosity ML (1+4) at 125° C. of 40 to 90.

In a preferred embodiment, the rubber matrix comprises, based on 100 parts by weight, a branched polyethylene with a content represented as A, in which 10≤A≤100 parts; and an EPM with a content represented as B and an EPDM with a content represented as C, in which 0≤B+C≤90 parts, where the branched polyethylene used is an ethylene homopolymer having a degree of branching of 80 to 105 branches/1000 carbon atoms, a weight average molecular weight of 268,000 to 356,000, and a Mooney viscosity ML (1+4) at 125° C. of 42 to 80.

In a preferred embodiment, a third monomer of EPDM is preferably a diene monomer, particularly selected from the group consisting of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-pentylidene-2-norbornene, 1,5-cyclooctadiene, 1,4-cyclooctadiene, and the like. In particular, the ethylene-propylene rubber may contain two or more diene monomers, for example, 5-ethylidene-2-norbornene and 5-vinyl-2-norbornene. The functional group of the diene monomer can function as an intrinsic auxiliary crosslinking agent in the peroxide vulcanization to improve the crosslinking efficiency. This reduces the amount and residue of the crosslinking agent and the auxiliary crosslinking agent required and the cost when they are added. The content in percentages by weight of the diene monomer relative to the ethylene-propylene rubber is preferably from 1% to 14%, more preferably from 3% to 10%, and further preferably from 4% to 7%.

In a preferred embodiment, the rubber composition further comprises auxiliary components, which comprise, based on 100 parts by weight of the rubber matrix, 0.2 to 10 parts of an auxiliary crosslinking agent, 3 to 15 parts of a metal oxide, 1 to 3 parts of a stabilizer, 0.5 to 2 parts of stearic acid, 0.5 to 5 parts of polyethylene glycol, and 0 to 3 parts of a vulcanization accelerator.

In a preferred embodiment, the stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB).

In a preferred embodiment, the polyethylene glycol comprises at least one of those polyethylene glycol having a molecular weight of 2000, 3400, and 4000.

In a preferred embodiment, the auxiliary crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, a metal salt of an unsaturated carboxylic acid, and sulfur.

In a preferred embodiment, the metal salt of an unsaturated carboxylic acid includes at least one of zinc acrylate, zinc methacrylate, magnesium methacrylate, calcium methacrylate, and aluminum methacrylate.

In a preferred embodiment, the metal oxide comprises at least one of zinc oxide, and magnesia.

In a preferred embodiment, the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

In a preferred embodiment, the crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

In a preferred embodiment, the plasticizer comprises at least one of high-viscosity paraffin oil, liquid ethylene-propylene rubber, liquid polyisobutene, and liquid 1,2-polybutadiene. The plasticizer has a high molecular weight, and a good compatibility with non-polar rubbers, is unlikely to be extracted by the brake fluid, and can exert a softening effect while not affecting the brake fluid expansion resistance of the rubber compound.

In a preferred embodiment, the reinforcing filler includes at least one of carbon black N330, carbon black N550, carbon black N774, calcium carbonate, and talc.

The crosslinking agent, the auxiliary crosslinking agent and the vulcanization accelerator involved in the rubber composition provided in the present invention all belong to a crosslinking system.

The rubber composition of the present invention may be present in the form of an uncrosslinked rubber mix, and may be present in the form of a vulcanized rubber after a further crosslinking reaction. The vulcanized rubber may also be simply referred to as a vulcanizate.

The present invention also provides a method for producing the rubber composition, which comprises the following steps:

(1) rubber mixing, comprising adding other components than a crosslinking system in a rubber composition sequentially to an internal mixer according to the parts by weight and mixing; then adding the crosslinking system, mixing uniformly, and discharging to obtain a rubber mix; and plasticating the rubber mix on an open mill, unloading the sheet, and standing for vulcanization later, where the crosslinking system includes a crosslinking agent, and also at least one of an auxiliary crosslinking agent and a vulcanization accelerator; and (2) vulcanization, comprising filling the rubber mix into a cavity of a mold, vulcanizing on a press vulcanizer by heating and pressing, and releasing from the mold to obtain a vulcanized rubber. In order to improve the mechanical strength and compression set resistance of the vulcanized rubber, a post vulcanization process can be further used for vulcanization.

The present invention also provides a brake rubber hose, having an inner rubber layer, a middle rubber layer, and an outer rubber layer, at least one of which comprises the above rubber composition.

The present invention further provides a method for producing a brake rubber hose, which comprises the following steps:

(1) rubber mixing, comprising setting a proper temperature and rotor speed of an internal mixer, adding a rubber matrix, pre-pressing, and mixing; then adding zinc oxide, stearic acid, polyethylene glycol and an anti-aging agent; next, adding carbon black and liquid ethylene-propylene rubber to the rubber compound, and mixing; and finally adding a crosslinking agent and an auxiliary crosslinking agent, mixing and discharging;

(2) plasticating on an open mill, unloading the sheet, and standing; and (3) extrusion molding, comprising extruding an inner rubber layer on a mandrel by using a cold feed extruder equipped with a T-slot die; then knitting with vinylon; next, extruding a middle rubber layer; then knitting with vinylon again; and extruding an outer rubber layer to obtain a hose blank, steam vulcanizing, cooling, removing from the mandrel, trimming, inspecting, and storing to obtain a brake rubber hose.

The present invention also provides a brake rubber diaphragm, where the rubber compound used comprises the above rubber composition.

The present invention further provides a method for producing a brake rubber diaphragm, which comprises the following steps:

(1) rubber mixing and molding, comprising setting a proper temperature and rotor speed of an internal mixer, adding a rubber matrix, pre-pressing, and mixing; then adding zinc oxide, stearic acid, polyethylene glycol and an anti-aging agent; next, adding carbon black and liquid ethylene-propylene rubber to the rubber compound, and mixing; then adding a crosslinking agent and an auxiliary crosslinking agent, mixing and discharging; and plasticating on an open mill, unloading the sheet, inspecting, remilling the discharged sheet, weighing and molding; and (2) mold vulcanizing, cooling, trimming, and inspecting, to obtain a finished product.

The present invention has the following beneficial effects. The rubber composition used has branched polyethylene. This contributes to the reduction in probability of tearing during production and the improvement of the compression set resistance of the product. Moreover, use of branched polyethylene in combination with an ethylene-propylene rubber having a low Mooney viscosity and a high ethylene content improves the overall processing performance, reduces the amount of the plasticizer used, and reduces the quality-associated problems caused by extraction of the plasticizer by the brake fluid.

DETAILED DESCRIPTION

The following examples are given to further illustrate the present invention, and not intended to limit the scope of the present invention. Some non-essential improvements and modifications made by the skilled person in the art based on the disclosure herein are still within the scope of the present invention.

To more clearly illustrate the embodiments of the present invention, the materials involved in the present invention are defined below.

The crosslinking system includes a crosslinking agent, and also at least one of an auxiliary crosslinking agent and a vulcanization accelerator.

The materials used in the rubber matrix of the present invention are as follows.

The EPM useful in the rubber matrix of the present invention preferably has a Mooney viscosity ML (1+4) at 125° C. of 20-40 and preferably has an ethylene content of 45%-60%. The EPDM used preferably has a Mooney viscosity ML (1+4) at 125° C. of 25 to 50, and preferably has an ethylene content of 55% to 75%. The third monomer is 5-ethylidene-2-norbornene, 5-vinyl-2-norbornene or dicyclopentadiene, and the content of the third monomer is 1%-7%.

The branched polyethylene can be obtained by the catalytic homopolymerization of ethylene in the presence of an (α-diimine) nickel catalyst and a cocatalyst. The structure of the (α-diimine) nickel catalyst used, the synthesis method and the method for preparing branched polyethylene therewith are disclosed in the prior art, as described in, without limitation, CN102827312A, CN101812145A, CN101531725A, CN104926962A, U.S. Pat. Nos. 6,103,658, and 6,660,677.

The branched polyethylene has a degree of branching of 60-130 branches/1000 carbon atoms, a weight average molecular weight of 66,000-518,000, and a Mooney viscosity ML (1+4) at 125° C. of 6-102. The degree of branching is measured by $^1$H NMR, and the molar percentages of various branches are measured by $^{13}$C NMR.

The details are shown in a table below:

7. Test of resistance to DOT brake fluid: The test is carried out at 120° C. for 72 h in accordance with the national standard GB/T1690-2006.

8. Test of optimum vulcanization time Tc90: The test is carried out at 170° C. in a rotorless vulcanizer in accordance with the national standard GB/T16584-1996.

The rubber composition used in the tests comprises, in parts by weight, 100 parts of a rubber matrix which comprises A parts of a branched polyethylene, in which 0<a≤100 parts, B parts of EPM, in which 0≤b<100 parts, and C parts of EPDM, in which 0≤c<100 parts; and further comprises, based on 100 parts by weight of the rubber matrix, 1.5 to 8 parts of a crosslinking agent, 40 to 140 parts of a reinforcing filler, and 0 to 40 parts of a plasticizer.

In a further embodiment, when the content of branched polyethylene in the rubber matrix is ≥90 parts, the content of the plasticizer is 6-40 parts based on 100 parts by weight of the rubber matrix, where the branched polyethylene has a degree of branching of 60-130 branches/1000 carbon atoms, a weight average molecular weight of 66,000-518,000, and a Mooney viscosity ML (1+4) at 125° C. of 6-102.

| Branched poly-ethylene No. | Degree of branching | Methyl content/ % | Ethyl content/ % | Propyl content/ % | Butyl content/ % | Pentyl content/ % | Content of hexyl and higher branches/ % | Weight average molecular weight/ 10,000 | Moleculear weight distribution | Mooney viscosity ML(1 + 4) at 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 116 | 51.2 | 17.6 | 8.2 | 5.8 | 5.1 | 12.1 | 20.1 | 2.1 | 23 |
| PER-3 | 105 | 54.0 | 13.7 | 6.4 | 5.3 | 5.1 | 15.5 | 26.8 | 2.1 | 42 |
| PER-4 | 102 | 56.2 | 12.9 | 6.2 | 5.2 | 4.9 | 14.6 | 27.9 | 2.1 | 52 |
| PER-5 | 99 | 59.6 | 11.6 | 5.8 | 4.9 | 5.1 | 13.0 | 28.3 | 1.8 | 63 |
| PER-6 | 90 | 62.1 | 9.4 | 5.4 | 4.6 | 4.5 | 14.0 | 32.1 | 2.1 | 77 |
| PER-7 | 82 | 64.2 | 8.7 | 5.3 | 4.2 | 3.9 | 13.7 | 35.6 | 1.7 | 80 |
| PER-8 | 70 | 66.5 | 7.2 | 4.6 | 3.2 | 3.2 | 15.3 | 43.6 | 2.1 | 93 |
| PER-9 | 60 | 68.1 | 7.1 | 4.2 | 2.7 | 2.8 | 15.1 | 51.8 | 2.2 | 102 |
| PER-10 | 102 | 56.8 | 12.7 | 6.1 | 5.2 | 5.1 | 13.9 | 34.8 | 1.9 | 66 |

Test Methods of Rubber Performances

1. Hardness test: The test is carried out using a hardness tester at room temperature in accordance with the national standard GB/T 531.1-2008.

2. Tensile strength and elongation at break performance test: The test is carried out with a type 2 dumbbell specimen using an electronic tensile tester at a tensile speed of 500 mm/min and a test temperature of 23±2° C. in accordance with the national standard GB/T528-2009.

3. Tear resistance test: The test is carried out with a right-angled specimen using an electronic tensile tester at a tensile speed of 500 mm/min and a test temperature of 23±2° C. in accordance with the national standard GB/T529-2008.

4. Mooney viscosity test: The test is carried out in accordance with the national standard GB/T1232.1-2000, with a Mooney viscosity meter at a test temperature of 125° C. by preheating for 1 minute, and the test is continued for 4 minutes.

5. Compression set resistance test: The test is carried out with a Type B specimen using a compression set tester in accordance with the national standard GB/T7759-1996, where the compression rate is 25%, and the test temperature is 120° C.

6. Hot air accelerated aging test: The test is carried out in a heat aging test chamber at 125° C. for 72 h in accordance with the national standard GB/T3512-2001.

In a further embodiment, when the content of branched polyethylene in the rubber matrix is ≥90 parts, the content of the plasticizer is 10-30 parts based on 100 parts by weight of the rubber matrix.

The rubber composition further comprises auxiliary components, which comprise 0.2 to 10 parts of an auxiliary crosslinking agent, 3 to 15 parts of a metal oxide, 1 to 3 parts of a stabilizer, 0.5 to 2 parts of stearic acid, 0.5 to 5 parts of polyethylene glycol, and 0 to 3 parts of a vulcanization accelerator.

The stabilizer comprises at least one of 2,2,4-trimethyl-1,2-dihydroquinoline polymer (RD), 6-ethoxy-2,2,4-trimethyl-1,2-dihydroquinoline (AW), and 2-mercaptobenzimidazole (MB). The polyethylene glycol comprises at least one of those polyethylene glycol having a molecular weight of 2000, 3400, and 4000.

The auxiliary crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, a metal salt of an unsaturated carboxylic acid, and sulfur.

The metal oxide comprises at least one of zinc oxide and magnesia. The vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

The crosslinking agent includes at least one of a peroxide crosslinking agent and sulfur. The peroxide crosslinking agent includes at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene, 2,5-dimethyl-2,5-bis(benzoylperoxy)hexane, tert-butyl peroxybenzoate, and tert-butylperoxy-2-ethylhexyl carbonate.

The plasticizer comprises at least one of high-viscosity paraffin oil, liquid ethylene-propylene rubber, liquid polyisobutene, and liquid 1,2-polybutadiene. The liquid ethylene propylene rubber in the plasticizer is used as a plasticizer, and its content is not included in the rubber matrix.

The reinforcing filler includes at least one of carbon black N330, carbon black N550, carbon black N774, calcium carbonate, and talc.

The processing method for obtaining the rubber composition will be described below in conjunction with specific examples.

EXAMPLE 1

Branched polyethylene No. PER-3 was used.

The processing steps of the rubber composition were as follows.

(1) Rubber mixing: The temperature of the internal mixer was set to 90° C., and the rotor speed was set to 50 rpm. 50 parts of EPDM and 50 parts of branched polyethylene were added, prepressed and mixed for 90 seconds. Then 70 parts of carbon black N550, and 10 parts of liquid polyisobutene were added to the rubber compound, and mixed for 3 min. Finally, 4 parts of the crosslinking agent dicumyl peroxide (DCP) was added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 2

Branched polyethylene No. PER-3 was used.

The processing steps of the rubber composition were as follows.

(1) Rubber mixing: The temperature of the internal mixer was set to 90° C., and the rotor speed was set to 50 rpm. 100 parts of branched polyethylene was added, prepressed and mixed for 90 seconds. Then 70 parts of carbon black N550, and 10 parts of liquid polyisobutene were added to the rubber compound, and mixed for 3 min. Finally, 4 parts of the crosslinking agent dicumyl peroxide (DCP) was added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 3

Branched polyethylene Nos. PER-3 and PER-6 were used.

The processing steps of the rubber composition were as follows.

(1) Rubber mixing: The temperature of the internal mixer was set to 90° C., and the rotor speed was set to 50 rpm. 70 parts of PER-3 and 30 parts of PER-6 were added, prepressed and mixed for 90 seconds. Then 70 parts of carbon black N550, and 10 parts of liquid polyisobutene were added to the rubber compound, and mixed for 3 min. Finally, 4 parts of the crosslinking agent dicumyl peroxide (DCP) was added, mixed for 2 min, and then discharged. The rubber mix was plasticated on an open mill with a roll temperature of 60° C. to obtain a sheet having a thickness of about 2.5 mm, which was stood for 20 hours. (2) After vulcanization, various tests were carried out after standing for 16 hrs.

COMPARATIVE EXAMPLE 1

The processing steps of the rubber composition were as follows.

(1) Rubber mixing: The temperature of the internal mixer was set to 90° C., and the rotor speed was set to 50 rpm. 100 parts of EPDM was added, prepressed and mixed for 90 seconds. Then 70 parts of carbon black N550, and 10 parts of liquid polyisobutene were added to the rubber compound, and mixed for 3 min. Finally, 4 parts of the crosslinking agent dicumyl peroxide (DCP) was added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 4

Branched polyethylene No. PER-9 was used.

The processing steps of the rubber composition were as follows.

(1) Rubber mixing: The temperature of the internal mixer was set to 100° C., and the rotor speed was set to 50 rpm. 90 parts of EPDM and 10 parts of branched polyethylene were added, prepressed and mixed for 90 seconds. 5 parts of zinc oxide, 0.5 part of stearic acid, and 1 part of the anti-aging agent 2,2,4-trimethyl-1,2-dihydroquinoline polymer (RD) were then added. Then 80 parts of carbon black N550, and 20 parts of liquid polyisobutene were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 5

Branched polyethylene No. PER-7 was used.

The processing steps of the rubber composition were as follows.

(1) Rubber mixing: The temperature of the internal mixer was set to 90° C., and the rotor speed was set to 50 rpm. 20 parts of EPM, 50 parts of EPDM and 30 parts of branched polyethylene were added, prepressed and mixed for 90 seconds. 5 parts of zinc oxide, 0.5 part of stearic acid, and 1 part of the anti-aging agent 2,2,4-trimethyl-1,2-dihydroquinoline polymer (RD) were then added. Then 80 parts of carbon black N550, and 20 parts of liquid polyisobutene were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 6

Branched polyethylene No. PER-3 was used.

The processing steps of the rubber composition were as follows.

(1) Rubber mixing: The temperature of the internal mixer was set to 90° C., and the rotor speed was set to 50 rpm. 30 parts of EPDM and 70 parts of branched polyethylene were added, prepressed and mixed for 90 seconds. 5 parts of zinc oxide, 0.5 part of stearic acid, and 1 part of the anti-aging agent 2,2,4-trimethyl-1,2-dihydroquinoline polymer (RD) were then added. Then 80 parts of carbon black N550, and 20 parts of liquid polyisobutene were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 7

Branched polyethylene Nos. PER-2 and PER-5 were used.

The processing steps of the rubber composition were as follows.

(1) Rubber mixing: The temperature of the internal mixer was set to 90° C., and the rotor speed was set to 50 rpm. 80 parts of PER-5 and 20 parts of PER-2 were added, prepressed and mixed for 90 seconds. 5 parts of zinc oxide, 0.5 part of stearic acid, and 1 part of the anti-aging agent 2,2,4-trimethyl-1,2-dihydroquinoline polymer (RD) were then added. Then 80 parts of carbon black N550, and 20 parts of liquid polyisobutene were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 8

Branched polyethylene Nos. PER-1 and PER-6 were used.

The processing steps of the rubber composition were as follows.

(1) Rubber mixing: The temperature of the internal mixer was set to 90° C., and the rotor speed was set to 50 rpm. 80 parts of PER-6 and 20 parts of PER-1 were added, prepressed and mixed for 90 seconds. 5 parts of zinc oxide, 0.5 part of stearic acid, and 1 part of the anti-aging agent 2,2,4-trimethyl-1,2-dihydroquinoline polymer (RD) were then added. Then 80 parts of carbon black N550, and 20 parts of liquid polyisobutene were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

COMPARATIVE EXAMPLE 2

The processing steps of the rubber composition were as follows.

(1) Rubber mixing: The temperature of the internal mixer was set to 90° C., and the rotor speed was set to 50 rpm. 100 parts of EPDM was added, prepressed and mixed for 90 seconds. 5 parts of zinc oxide, 0.5 part of stearic acid, and 1 part of the anti-aging agent 2,2,4-trimethyl-1,2-dihydroquinoline polymer (RD) were then added. Then 80 parts of carbon black N550, and 20 parts of liquid polyisobutene were added to the rubber compound, and mixed for 3 min. Finally, 3 parts of the crosslinking agent dicumyl peroxide (DCP) and 1 part of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The performance test data of Examples 1 to 8 and Comparative Examples 1 and 2 are shown in a table below.

| Test Item | Example 1 | Example 2 | Example 3 | Comparative Example 1 | Example 4 | Example 5 | Example 6 | Example 7 | Example 8 | Comparative Example 2 |
|---|---|---|---|---|---|---|---|---|---|---|
| Hardness | 74 | 73 | 75 | 75 | 77 | 74 | 73 | 74 | 75 | 74 |
| Tensile strength/MPa | 20.8 | 22.6 | 24.1 | 18.7 | 21.5 | 21.9 | 22.4 | 23.3 | 22.1 | 19.6 |
| Elongation at break % | 336 | 389 | 376 | 283 | 332 | 412 | 392 | 382 | 428 | 328 |
| Tear strength N/mm | 34 | 39 | 45 | 31 | 36 | 37 | 38 | 47 | 43 | 32 |
| Compression | 33 | 30 | 30 | 37 | 37 | 37 | 33 | 29 | 31 | 39 |

-continued

| Test Item | Example 1 | Example 2 | Example 3 | Comparative Example 1 | Example 4 | Example 5 | Example 6 | Example 7 | Example 8 | Comparative Example 2 |
|---|---|---|---|---|---|---|---|---|---|---|
| set (at 120° C. for 24 h) | | | | | | | | | | |
| After aging (at 125° C. for 72 h) | | | | | | | | | | |
| Hardness | 76 | 76 | 77 | 77 | 79 | 76 | 76 | 77 | 78 | 76 |
| Retention rate of tensile strength/% | 105 | 105 | 106 | 108 | 105 | 106 | 105 | 108 | 106 | 109 |
| Retention rate of elongation at break/% | 94 | 95 | 94 | 93 | 95 | 93 | 92 | 93 | 92 | 92 |
| After aging in DOT4 (at 120° C. for 72 h) | | | | | | | | | | |
| Hardness | 72 | 71 | 73 | 72 | 74 | 72 | 71 | 72 | 72 | 70 |
| Retention rate of tensile strength/% | 105 | 105 | 103 | 104 | 104 | 105 | 102 | 103 | 104 | 102 |
| Retention rate of elongation at break/% | 93 | 94 | 94 | 95 | 93 | 92 | 91 | 92 | 92 | 91 |
| Variation of volume/% | +3 | +4 | +3 | +4 | +2 | +2 | +3 | +2 | +3 | +2 |

EXAMPLE 9

Branched polyethylene No. PER-5 was used.

The processing steps of the rubber composition were as follows.

(1) Rubber mixing: The temperature of the internal mixer was set to 90° C., and the rotor speed was set to 50 rpm. 100 parts of branched polyethylene was added, prepressed and mixed for 90 seconds. 5 parts of zinc oxide, 0.5 part of stearic acid, 2 parts of polyethylene glycol PEG3400 and 1 part of the anti-aging agent 2,2,4-trimethyl-1,2-dihydroquinoline polymer (RD) were then added. Then 80 parts of carbon black N550, and 30 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 10

Branched polyethylene No. PER-8 was used.

The processing steps of the rubber composition were as follows.

(1) Rubber mixing: The temperature of the internal mixer was set to 100° C., and the rotor speed was set to 50 rpm. 80 parts of EPDM and 20 parts of branched polyethylene were added, prepressed and mixed for 90 seconds. 3 parts of zinc oxide, 0.5 part of stearic acid, 1 part of polyethylene glycol PEG3400 and 1 part of the anti-aging agent 2,2,4-trimethyl-1,2-dihydroquinoline polymer (RD) were then added. Then 60 parts of carbon black N550, and 20 parts of liquid ethylene-propylene rubber were added to the rubber compound, and mixed for 3 min. Finally, 2 parts of the crosslinking agent dicumyl peroxide (DCP), 1 part of the auxiliary crosslinking agent triallyl isocyanurate (TAIC), and 0.2 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 11

Branched polyethylene No. PER-6 was used.

The processing steps of the rubber composition were as follows.

(1) Rubber mixing: The temperature of the internal mixer was set to 90° C., and the rotor speed was set to 50 rpm. 70 parts of EPDM and 30 parts of branched polyethylene were added, prepressed and mixed for 90 seconds. 3 parts of zinc oxide, 0.5 part of stearic acid, 0.5 part of polyethylene glycol PEG3400 and 1 part of the anti-aging agent 2,2,4-trimethyl-1,2-dihydroquinoline polymer (RD) were then added. Then 40 parts of carbon black N550 was added to the rubber compound, and mixed for 3 min. Finally, 1 part of the crosslinking agent dicumyl peroxide (DCP), 0.3 part of the auxiliary crosslinking agent triallyl isocyanurate (TAIC), 0.5 part of the crosslinking agent sulfur, 1 part of N-cyclohexyl-2-benzothiazole sulfenamide (CZ), and 0.8 part of tetramethyl thiuram disulfide (TMTD) were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 12

Branched polyethylene Nos. PER-1, PER-2 and PER-6 were used.

The processing steps of the rubber composition were as follows.

(1) Rubber mixing: The temperature of the internal mixer was set to 90° C., and the rotor speed was set to 50 rpm. 10 parts of PER-1, 20 parts of PER-2 and 70 parts of PER-6 were added, prepressed and mixed for 90 seconds. 5 parts of zinc oxide, 0.5 part of stearic acid, 0.5 part of polyethylene glycol PEG3400 and 1 part of the anti-aging agent 2,2,4-trimethyl-1,2-dihydroquinoline polymer (RD) were then added. Then 60 parts of carbon black N550, and 6 parts of liquid polyisobutene were added to the rubber compound, and mixed for 3 min. Finally, 3 parts of the crosslinking agent dicumyl peroxide (DCP), 1 part of the auxiliary crosslinking agent triallyl isocyanurate (TAIC), and 0.3 part of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 13

Branched polyethylene Nos. PER-4 and PER-6 were used.

The processing steps of the rubber composition were as follows.

(1) Rubber mixing: The temperature of the internal mixer was set to 90° C., and the rotor speed was set to 50 rpm. 50 parts of PER-4 and 50 parts of PER-6 were added, prepressed and mixed for 90 seconds. 5 parts of zinc oxide, 1 part of stearic acid, 5 parts of polyethylene glycol PEG3400 and 2 parts of the anti-aging agent 2,2,4-trimethyl-1,2-dihydroquinoline polymer (RD) were then added. Then 100 parts of carbon black N550, 20 parts of liquid ethylene-propylene rubber and 12 parts of liquid polyisobutene were added to the rubber compound, and mixed for 3 min. Finally, 6 parts of the crosslinking agent dicumyl peroxide (DCP), 2 parts of the auxiliary crosslinking agent triallyl isocyanurate (TAIC), and 8 parts of the auxiliary crosslinking agent 1,2-polybutadiene were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

EXAMPLE 14

Branched polyethylene Nos. PER-4 and PER-6 were used.

The processing steps of the rubber composition were as follows.

(1) Rubber mixing: The temperature of the internal mixer was set to 90° C., and the rotor speed was set to 50 rpm. 50 parts of PER-4 and 50 parts of PER-6 were added, prepressed and mixed for 90 seconds. 5 parts of zinc oxide, 2 parts of stearic acid, 5 parts of polyethylene glycol PEG3400 and 2 parts of the anti-aging agent 2,2,4-trimethyl-1,2-dihydroquinoline polymer (RD) were then added. Then 140 parts of carbon black N550, 20 parts of liquid ethylene-propylene rubber and 20 parts of liquid polyisobutene were added to the rubber compound, and mixed for 3 min. Finally, 8 parts of the crosslinking agent dicumyl peroxide (DCP), 3 parts of the auxiliary crosslinking agent triallyl isocyanurate (TAIC), and 0.3 parts of the auxiliary crosslinking agent sulfur were added, mixed for 2 min, and then discharged. The rubber mix was plasticated on an open mill with a roll temperature of 60° C. to obtain a sheet having a thickness of about 2.5 mm, which was stood for 20 hours.

(2) After vulcanization, various tests were carried out after standing for 16 hrs.

The performance test data of Examples 9 to 14 are shown in a table below.

| Test Item | Example 9 | Example 10 | Example 11 | Example 12 | Example 13 | Example 14 |
|---|---|---|---|---|---|---|
| Hardness | 75 | 77 | 75 | 75 | 76 | 78 |
| Tensile strength/MPa | 24.9 | 20.7 | 24.3 | 24.8 | 23.7 | 24.3 |
| Elongation at break % | 489 | 375 | 388 | 432 | 386 | 355 |
| Tear strength N/mm | 46 | 37 | 39 | 42 | 41 | 43 |
| Compression set (at 120° C. for 24 h) | 29 | 36 | 34 | 31 | 33 | 32 |
| After aging (at 125° C. for 72 h) | | | | | | |
| Hardness | 78 | 80 | 78 | 77 | 77 | 80 |
| Retention rate of tensile strength/% | 97 | 106 | 94 | 107 | 109 | 109 |
| Retention rate of elongation at break/% | 92 | 93 | 83 | 92 | 93 | 89 |
| After aging in DOT4 (at 120° C. for 72 h) | | | | | | |
| Hardness | 72 | 74 | 73 | 73 | 74 | 74 |
| Retention rate of tensile strength/% | 105 | 102 | 92 | 103 | 104 | 102 |
| Retention rate of elongation at break/% | 91 | 93 | 87 | 91 | 92 | 88 |
| Variation of volume/% | +1 | +3 | +3 | +3 | +2 | +1 |

Specific embodiments of the present invention further include use of the rubber composition mainly in the production of brake rubber diaphragms and brake rubber hoses, and the specific embodiments are as follows:

EXAMPLE 15

The present invention provides a brake rubber hose having an inner rubber layer using the rubber composition, and the brake rubber hose comprises the inner rubber layer, a first knitted layer, a middle rubber layer, a second knitted layer and an outer rubber layer. The production method comprises the following steps:

(1) Rubber mixing: The formulation and mixing process of the inner rubber layer were as follows. The temperature of the internal mixer was set to 90° C., and the rotor speed was set to 50 rpm. 100 parts of branched polyethylene PER-5 was added, prepressed and mixed for 90 seconds. 5 parts of zinc oxide, 0.5 part of stearic acid, 2 parts of polyethylene glycol PEG3400 and 1 part of the anti-aging agent RD were then added. Then 80 parts of carbon black N550, and 30 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill to obtain a sheet which was then unloaded and stood for 24 hours.

(2) Extrusion molding

An inner rubber layer was extruded on a mandrel at 90° C. by using a 60 mm cold feed extruder equipped with a T-slot die; then a layer was knitted with vinylon; next, a middle rubber layer was extruded; then a layer was knitted with vinylon again; and an outer rubber layer was extruded to obtain a hose blank, which was vulcanized, cooled, removed from the mandrel, trimmed, inspected, and stored, where the vulcanization process was steam vulcanization at 160° C. for 30 min under a steam pressure of 0.6 MPa.

EXAMPLE 16

The present invention provides a brake rubber hose having an inner rubber layer and an outer rubber layer using the rubber composition, and the brake rubber hose comprises the inner rubber layer, a first knitted layer, a middle rubber layer, a second knitted layer and the outer rubber layer. The production method comprises the following steps:

(1) Rubber mixing: The formulations and mixing processes of the inner rubber layer and the outer rubber layer of the brake rubber hose were as follows. The temperature of the internal mixer was set to 90° C., and the rotor speed was set to 50 rpm. 100 parts of branched polyethylene PER-5 was added, prepressed and mixed for 90 seconds. 5 parts of zinc oxide, 0.5 part of stearic acid, 2 parts of polyethylene glycol PEG3400 and 1 part of the anti-aging agent RD were then added. Then 80 parts of carbon black N550, and 30 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill to obtain a sheet which was then unloaded and stood for 24 hours.

(2) Extrusion molding: An inner rubber layer was extruded on a mandrel at 90° C. by using a 60 mm cold feed extruder equipped with a T-slot die; then a layer was knitted with vinylon; next, a middle rubber layer was extruded; then a layer was knitted with vinylon again; and an outer rubber layer was extruded to obtain a hose blank, which was vulcanized, cooled, removed from the mandrel, trimmed, inspected, and stored, where the vulcanization process was steam vulcanization at 160° C. for 30 min under a steam pressure of 0.6 MPa.

EXAMPLE 17

The present invention provides a brake rubber hose having an inner rubber layer, a middle rubber layer and an outer rubber layer using the rubber composition, and the brake rubber hose comprises the inner rubber layer, a first knitted layer, the middle rubber layer, a second knitted layer and the outer rubber layer. The production method comprises the following steps:

(1) Rubber mixing: The formulations and mixing processes of the rubber layers were as follows. The temperature of the internal mixer was set to 90° C., and the rotor speed was set to 50 rpm. 100 parts of branched polyethylene PER-5 was added, prepressed and mixed for 90 seconds. 5 parts of zinc oxide, 0.5 part of stearic acid, 2 parts of polyethylene glycol PEG3400 and 1 part of the anti-aging agent RD were then added. Then 80 parts of carbon black N550, and 30 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill to obtain a sheet which was then unloaded and stood for 24 hours.

(2) Extrusion molding

An inner rubber layer was extruded on a mandrel at 90° C. by using a 60 mm cold feed extruder equipped with a T-slot die; then a layer was knitted with vinylon; next, a middle rubber layer was extruded; then a layer was knitted with vinylon again; and an outer rubber layer was extruded to obtain a hose blank, which was vulcanized, cooled, removed from the mandrel, trimmed, inspected, and stored, where the vulcanization process was steam vulcanization at 160° C. for 30 min under a steam pressure of 0.6 MPa.

EXAMPLE 18

The present invention provides a brake rubber hose having an outer rubber layer using the rubber composition, and the brake rubber hose comprises an inner rubber layer, a knitted layer, a middle rubber layer, a knitted layer and the outer rubber layer. The production method comprises the following steps:

(1) Rubber mixing:

The formulations and mixing processes of the rubber layers were as follows. The temperature of the internal mixer was set to 90° C., and the rotor speed was set to 50 rpm. 100 parts of branched polyethylene PER-5 was added, prepressed and mixed for 90 seconds. 5 parts of zinc oxide, 0.5 part of stearic acid, 2 parts of polyethylene glycol PEG3400 and 1 part of the anti-aging agent RD were then added. Then 80 parts of carbon black N550, and 30 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill to obtain a sheet which was then unloaded and stood for 24 hours.

(2) Extrusion molding

An inner rubber layer was extruded on a mandrel at 90° C. by using a 60 mm cold feed extruder equipped with a T-slot die; then a layer was knitted with vinylon; next, a middle rubber layer was extruded; then a layer was knitted with vinylon again; and an outer rubber layer was extruded to obtain a hose blank, which was vulcanized, cooled, removed from the mandrel, trimmed, inspected, and stored, where the vulcanization process was steam vulcanization at 160° C. for 30 min under a steam pressure of 0.6 MPa.

EXAMPLE 19

A method for producing a brake fluid resistant brake rubber diaphragm comprises the following steps:

(1) Mixing and molding: The temperature of the internal mixer was set to 90° C., and the rotor speed was set to 50 rpm. 100 parts of branched polyethylene PER-5 was added, prepressed and mixed for 90 seconds. 15 parts of zinc oxide, 2 parts of stearic acid, 1 part of polyethylene glycol PEG3400 and 1 part of the anti-aging agent 2,2,4-trimethyl-1,2-dihydroquinoline polymer (RD) were then added. Then 60 parts of carbon black N762, and 10 parts of liquid ethylene-propylene rubber were added to the rubber compound, and mixed for 3 min. Finally, 3 parts of the crosslinking agent dicumyl peroxide (DCP) and 2 parts of the auxiliary crosslinking agent trimethylolpropane trimethacrylate (TMPTMA) were added, mixed for 2 min, and then discharged. The rubber mix was plasticated on an open mill to obtain a sheet which was then unloaded, stood and inspected. The sheet was remilled, weighed and molded.

(2) Vulcanization: After mold vulcanizing, cooling, trimming, and inspecting, a finished product was obtained, where the vulcanization temperature was 160° C., the steam pressure was 0.6 MPa, and the vulcanization time was 25 minutes.

EXAMPLE 20

A method for producing a brake fluid resistant brake rubber diaphragm comprises the following steps:

(1) Mixing and molding: The temperature of the internal mixer was set to 90° C., and the rotor speed was set to 50 rpm. 100 parts of branched polyethylene PER-10 was added, prepressed and mixed for 90 seconds. 15 parts of zinc oxide, 2 parts of stearic acid, 1 part of polyethylene glycol PEG3400 and 1 part of the anti-aging agent MB were then added. Then 60 parts of carbon black N762, and 10 parts of liquid ethylene-propylene rubber were added to the rubber compound, and mixed for 3 min. Finally, 3 parts of the crosslinking agent dicumyl peroxide (DCP) and 2 parts of the auxiliary crosslinking agent trimethylolpropane trimethacrylate (TMPTMA) were added, mixed for 2 min, and then discharged. The rubber mix was plasticated on an open mill to obtain a sheet which was then unloaded, stood and inspected. The sheet was remilled, weighed and molded.

(2) Vulcanization: After mold vulcanizing, cooling, trimming, and inspecting, a finished product was obtained, where the vulcanization temperature was 160° C., the steam pressure was 0.6 MPa, and the vulcanization time was 25 minutes.

EXAMPLE 21

The present invention provides a brake rubber hose comprising an inner rubber layer, a first knitted layer, a middle rubber layer, a second knitted layer and an outer rubber layer. The production method comprises the following steps:

(1) Rubber mixing:

The formulation and mixing process of the inner rubber layer were as follows. The temperature of the internal mixer was set to 90° C., and the rotor speed was set to 50 rpm. 100 parts of branched polyethylene PER-10 was added, prepressed and mixed for 90 seconds. 5 parts of zinc oxide, 0.5 part of stearic acid, 2 parts of polyethylene glycol PEG3400, 1 part of the anti-aging agent RD, and 1 part of the anti-aging agent MB were then added. Then 50 parts of carbon black N774, 5 parts of liquid polyisobutene and 5 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill to obtain a sheet which was then unloaded and stood for 24 hours.

The formulation and mixing process of the middle rubber layer were as follows. The temperature of the internal mixer was set to 90° C., and the rotor speed was set to 50 rpm. 100 parts of branched polyethylene PER-10 was added, prepressed and mixed for 90 seconds. 5 parts of zinc oxide, 0.5 part of stearic acid, 2 parts of polyethylene glycol PEG3400, 3 parts of coumarone resin, 2 parts of RX-80, 1 part of the anti-aging agent RD, and 1 part of the anti-aging agent MB were then added. Then 50 parts of carbon black N774, 5 parts of liquid polyisobutene and 5 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill to obtain a sheet which was then unloaded and stood for 24 hours.

The formulation and mixing process of the outer rubber layer were as follows. The temperature of the internal mixer was set to 90° C., and the rotor speed was set to 50 rpm. 100 parts of branched polyethylene PER-10 was added, prepressed and mixed for 90 seconds. 5 parts of zinc oxide, 0.5 part of stearic acid, 2 parts of polyethylene glycol PEG3400, 1 part of the anti-aging agent RD, and 1 part of the anti-aging agent MB were then added. Then 80 parts of carbon black N774, 15 parts of liquid polyisobutene and 15 parts of liquid ethylene-propylene rubber were added to the rubber compound, and mixed for 3 min. Finally, 5 parts of the crosslinking agent dicumyl peroxide (DCP) and 2 parts of the auxiliary crosslinking agent triallyl isocyanurate (TAIC) were added, mixed for 2 min, and then discharged. The rubber mix was plasticated on an open mill to obtain a sheet which was then unloaded and stood for 24 hours.

(2) Extrusion molding

An inner rubber layer was extruded on a mandrel at 90° C. by using a 60 mm cold feed extruder equipped with a T-slot die; then a layer was knitted with vinylon; next, a middle rubber layer was extruded; then a layer was knitted with vinylon again; and an outer rubber layer was extruded to obtain a hose blank, which was vulcanized, cooled, removed from the mandrel, trimmed, inspected, and stored, where the vulcanization process was steam vulcanization at 160° C. for 30 min under a steam pressure of 0.6 MPa.

What is claimed is:

1. A brake rubber hose, comprising an inner rubber layer, a middle rubber layer, and an outer rubber layer, wherein, the at least one of the inner rubber layer, the middle rubber layer, and the outer rubber layer comprises a rubber compound formed from a rubber composition comprising a rubber matrix and essential components, wherein the rubber matrix comprises, based on 100 parts by weight of the rubber matrix, a branched polyethylene with a content represented as A, in which 0<A≤100 parts,
an EPM with a content represented as B, in which 0≤B<100 parts, and an EPDM with a content represented as C, in which 0≤C<100 parts;

and based on 100 parts by weight of the rubber matrix, the essential components comprise 1.5 to 8 parts of a crosslinking agent, 40 to 140 parts of a reinforcing filler, and 0-40 parts of a plasticizer;

wherein the branched polyethylene is an ethylene homopolymer having a branching degree of from about 60 to 99 branches/1000 carbon atoms, a weight average molecular weight of from 66,000 to 518,000, and a Mooney viscosity ML (1+4) at 125° C. of from 6 to 102.

2. The brake rubber hose according to claim 1, wherein the ethylene homopolymer has a branching degree of from 60 to 90 branches/1000 carbon atoms.

3. The brake rubber hose according to claim 1, wherein the ethylene homopolymer has a branching degree of from 60 to 82 branches/1000 carbon atoms.

4. The brake rubber hose according to claim 1, wherein the ethylene homopolymer has a branching degree of from 60 to 70 branches/1000 carbon atoms.

5. The brake rubber hose according to claim 1, wherein the ethylene homopolymer has a branching degree of 60 branches/1000 carbon atoms, 70 branches/1000 carbon atoms, 82 branches/1000 carbon atoms, 90 branches/1000 carbon atoms, or 99 branches/1000 carbon atoms.

6. The brake rubber hose according to claim 1, wherein the ethylene homopolymer has a branching degree of about 60 branches/1000 carbon atoms, about 70 branches/1000 carbon atoms, about 82 branches/1000 carbon atoms, about 90 branches/1000 carbon atoms, or 99 branches/1000 carbon atoms.

7. The brake rubber hose according to claim 1, wherein if the content of the branched polyethylene in the rubber matrix is more than 90 parts, based on 100 parts by weight of the rubber matrix, the rubber composition comprises 6-40 parts of the plasticizer.

8. The brake rubber hose according to claim 7, wherein, if the content of the branched polyethylene in the rubber matrix is more than 90 parts, based on 100 parts by weight of the rubber matrix, the rubber composition comprises 10-30 parts of the plasticizer.

9. The brake rubber hose according to claim 1, wherein, the crosslinking agent comprises at least one of a peroxide crosslinking agent and sulfur, wherein, the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy) hexane, 2,5-dimethyl-2,5-di(tert-butylperoxy) hexyne-3, bis(tert-butylperoxyisopropyl)benzene, 2,5-dimethyl-2,5-bis(benzoylperoxy) hexane, tert-butyl peroxybenzoate, and tert-butylperoxy-2-ethylhexyl carbonate.

10. The brake rubber hose according to claim 1, wherein, the plasticizer comprises at least one of a paraffin oil, liquid ethylene-propylene rubber, liquid polyisobutene, and liquid 1,2-polybutadiene.

11. The brake rubber hose according to claim 1, wherein, the reinforcing filler comprises at least one of carbon black N330, carbon black N550, carbon black N774, calcium carbonate, and talc.

12. A brake rubber diaphragm comprising a rubber compound formed from a rubber composition comprising a rubber matrix and essential components, wherein the rubber matrix comprises, based on 100 parts by weight of the rubber matrix, a branched polyethylene with a content represented as A, in which 0<A<100 parts, an EPM with a content represented as B, in which 0<B<100 parts, and an EPDM with a content represented as C, in which 0<C<100 parts;

and based on 100 parts by weight of the rubber matrix, the essential components comprise 1.5 to 8 parts of a crosslinking agent, 40 to 140 parts of a reinforcing filler, and 0-40 parts of a plasticizer;

wherein the branched polyethylene is an ethylene homopolymer having a branching degree of from about 60 to 99 branches/1000 carbon atoms, a weight average molecular weight of from 66,000 to 518,000, and a Mooney viscosity ML (1+4) at 125° C. of from 6 to 102.

13. The brake rubber diaphragm according to claim 12, wherein, the rubber composition further comprises auxiliary components, which comprise, based on 100 parts by weight of the rubber matrix, 0.2 to 10 parts of an auxiliary crosslinking agent, 3 to 15 parts of a metal oxide, 1 to 3 parts of a stabilizer, 0.5 to 2 parts of stearic acid, 0.5 to 5 parts of polyethylene glycol, and 0 to 3 parts of a vulcanization accelerator, wherein, the stabilizer comprises at least one of 2,2,4-trimethyl-1, 2-dihydroquinoline polymer (RD), 6-ethoxy-2,2,4-trimethyl-1,2-dihydroquinoline (AW), and 2-mercaptobenzimidazole (MB);

the polyethylene glycol comprises at least one of those polyethylene glycol having a molecular weight of 2000, 3400, and 4000;

the auxiliary crosslinking agent comprises at least one of triallyl cyanurate, triallyl isocyanurate, ethylene glycol dimethacrylate, triethylene glycol dimethacrylate, triallyl trimellitate, trimethylolpropane trimethacrylate, N,N'-m-phenylene bismaleimide, N,N'-bis(furfurylidene) acetone, 1,2-polybutadiene, a metal salt of an unsaturated carboxylic acid, and sulfur;

the metal oxide comprises at least one of zinc oxide and magnesia; and the vulcanization accelerator comprises at least one of 2-mercaptobenzothiazole, dibenzothiazyl disulfide, tetramethyl thiuram monosulfide, tetramethyl thiuram disulfide, tetraethyl thiuram disulfide, N-cyclohexyl-2-benzothiazole sulfenamide, N,N-dicyclohexyl-2-benzothiazole sulfenamide, bismaleimide, and ethylene thiourea.

14. The brake rubber diaphragm according to claim 12, wherein, the crosslinking agent comprises at least one of a peroxide crosslinking agent and sulfur, wherein, the peroxide crosslinking agent comprises at least one of di-tert-butyl peroxide, dicumyl peroxide, tert-butyl cumyl peroxide, 1,1-di-tert-butyl peroxide-3,3,5-trimethylcyclohexane, 2,5-dimethyl-2,5-di(tert-butylperoxy) hexane, 2,5-dimethyl-2,5-di(tert-butylperoxy) hexyne-3, bis(tert-butylperoxyisopropyl) benzene, 2,5-dimethyl-2,5-bis(benzoylperoxy) hexane, tert-butyl peroxybenzoate, and tert-butylperoxy-2-ethylhexyl carbonate.

15. The brake rubber diaphragm according to claim 12, wherein, the plasticizer comprises at least one of a paraffin oil, liquid ethylene-propylene rubber, liquid polyisobutene, and liquid 1,2-polybutadiene.

16. The brake rubber diaphragm according to claim 12, wherein, the reinforcing filler comprises at least one of carbon black N330, carbon black N550, carbon black N774, calcium carbonate, and talc.

* * * * *